United States Patent [19]

McBride

[11] Patent Number: 4,810,916

[45] Date of Patent: Mar. 7, 1989

[54] ROTARY POWER TOOL HAVING DUAL OUTPUTS

[76] Inventor: Scott McBride, One Hillside Terrace, Irvington, N.Y. 10533

[21] Appl. No.: 133,552

[22] Filed: Dec. 16, 1987

[51] Int. Cl.$^4$ .............................................. H02K 7/14
[52] U.S. Cl. ....................................... 310/50; 74/416; 74/665 H; 310/83; 408/22; 408/25
[58] Field of Search ............... 74/416, 417, 423, 665 H; 310/47, 50, 83; 408/20, 22, 25, 26, 241 R, 710

[56] References Cited

U.S. PATENT DOCUMENTS

| | | | |
|---|---|---|---|
| 1,513,387 | 10/1924 | Greve | 74/665 H |
| 1,563,887 | 12/1925 | Wiespetat | 408/710 |
| 1,650,911 | 11/1927 | Schneider | 310/50 |
| 1,750,957 | 3/1930 | Fowler | 310/50 |
| 2,291,729 | 8/1942 | Koett | 74/417 |
| 3,704,959 | 12/1972 | John | 408/710 |
| 4,299,004 | 11/1981 | Lancaster | 310/50 |

Primary Examiner—Patrick R. Salce
Assistant Examiner—D. L. Rebsch
Attorney, Agent, or Firm—Felfe & Lynch

[57] ABSTRACT

A rotary power tool comprises a body for supplying a power drive and includes a central body portion having two extensions in opposite directions therefrom. The power tool may utilize a screwdriver bit at one extension and a drill at the other extension. Both the screwdriver bit and the drill bit are rotatable in the same working direction as seen from the central body portion looking toward each driven portion.

11 Claims, 1 Drawing Sheet

U.S. Patent  Mar. 7, 1989  4,810,916
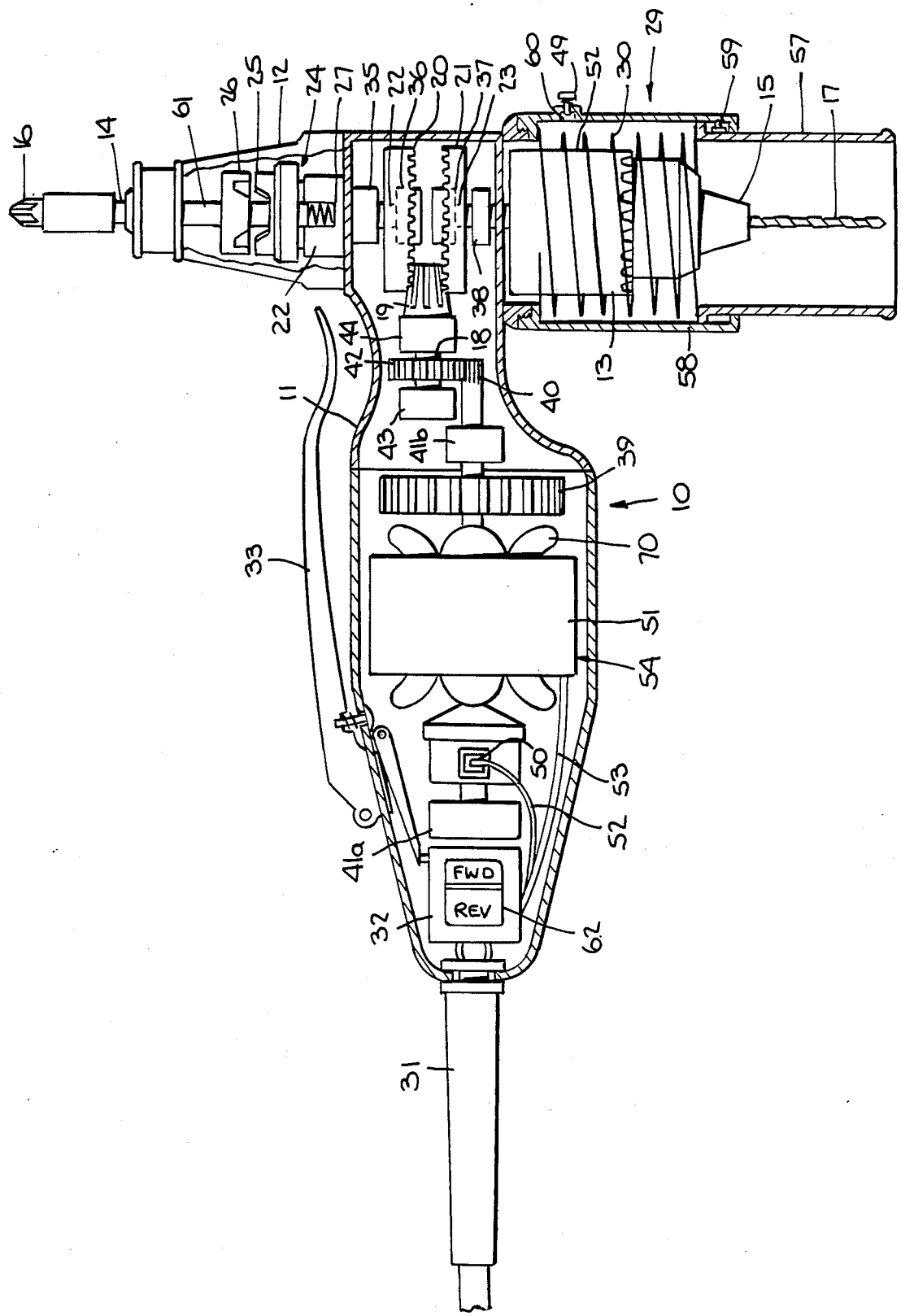

ROTARY POWER TOOL HAVING DUAL OUTPUTS

This invention relates to a rotary power tool and, more particularly, to a dual head portable rotary power tool.

U.S. Pat. No. 1,650,911-Schneider relates to a rotary power tool which is adaptable for use as a drill, a screw driver, a tapper and a wrench. This tool has the disadvantage that the toolheads extend therefrom in the same direction and, in order, for example, to use the screw driver, the drill bit must be removed to prevent interference with the object into which the screw is being driven.

U.S. Pat. No. 1,750,957-Fowler relates to a drill attachment having extensions therefrom in opposite directions. However, while the drill of one extension rotates clockwise, the chuck or attachment of the other extension rotates counter-clockwise as seen from the main body of the tool. Accordingly, when nuts or the like are to be driven in one direction, the several parts bear the relation shown in the drawing of FIG. 1 of the Fowler patent. When they are to be turned in the other direction, the shaft carrying the drill at one end and chuck at the other end must be removed and turned end for end. Thus, proper directional turning of the shaft may be obtained to either apply or remove nuts or the like by removing and turning the shaft end for end. Accordingly, the tool does not provide the convenience that both ends rotate in the same direction as seen from the main body of the tool. Thus, the tool does not provide the convenience of being able to drill a hole and subsequently drive a screw in the hole, without reversing shaft rotation, insofar as standard clockwise drills and screws are concerned. Further, when a change in rotation is to be effected, the process must prove cumbersome and time-consuming.

Lancaster U.S. Pat. No. 4,299,004 relates to a powered hand tool for household cleaning operations having two drive shafts for polishing wheels extending therefrom in perpendicular directions. The polishing wheels turn in opposite directions as seen from each of their drives. Also, the perpendicular drives could result in interference when working in a corner.

It is an object of the present invention, therefore, to provide a new and improved rotary power tool which avoids one or more of the disadvantages and limitations of prior such apparatus.

It is another object of the invention to provide a new and improved rotary power tool having a working and non-working extension in which interference by a non-working bit is eliminated.

It is another object of the invention to provide a new and improved rotary power tool in which both ends simultaneously turn in the same direction as viewed from the main body of the tool without the manipulation of a reversing mechanism.

It is another object of the invention to provide a new and improved rotary power tool in which both ends can utilize drills cut for clockwise rotation.

It is another object of the invention to provide a new and improved dual-head power tool capable of electrically controlled reversal of rotation.

In accordance with the invention, a rotary power tool comprises a body for supplying a power drive and including a central body portion having two extensions in opposite directions therefrom including rotary driven portions, for tools, which are rotatable in the same working direction as seen from the central body portion looking toward each driven portion.

For a better understanding of the present invention, together with other and further objects thereof, reference is made to the following description, taken in connection with the accompanying drawing, and its scope will be pointed out in the appended claims.

Referring now to the drawing:

The FIGURE is a partly diagrammatic cross-sectional view of a rotary power tool in accordance with the invention.

Referring now more particularly to the drawing, the rotary power tool comprises a body 10 for supplying a power drive and including a central body portion 11 having two extensions 12, 13, therefrom including rotary driven portions 14, 15, respectively, for tools 16, 17, respectively. The rotary driven portions 14, 15 are rotatable in the same working direction as seen from the central body portion 11 looking toward each driven portion.

The two extensions 12, 13 are preferably disposed generally normal to the central body portion 11. The central body portion includes a rotary drive mechanism 18 including a drive pinion or gear 19. The two extensions 12, 13 include gears 20, 21, respectively, driven by the pinion 19 and include rotatable primary shafts 22, 23, respectively, individually attached to the gears 20, 21, respectively. The extension 12 includes a clutch 24 having one clutch member 25 coupled to the primary shaft 22 and having another clutch member 26 coupled to the one clutch member 25 during use of a tool 16, for example, a screwdriver bit coupled to the other clutch member 26 by means of a secondary idler shaft 61. A spring 27 under compression maintains the clutch member 26 separated from the clutch member 25, so long as there is no external pressure applied to the screwdriver bit 16. When the screwdriver bit 16 is in use and pressure is applied thereto, the clutch is automatically engaged.

The other tool 17 preferably is a drill bit cut for clockwise rotation when working, as most drill bits are so cut. A displaceable guard mechanism 29 surrounds the drill for safety. A spring 30 maintains the guard 29 in an extended position. When the pinion 19 rotates, the drill bit 17 preferably rotates clockwise as seen from the main body portion 11 of the tool, and the screwdriver bit 16 preferably rotates in the clockwise direction as seen from the main body portion of the tool when pressure is applied to the screwdriver bit 16 to engage the clutch 24. For removal of standard screws, or for backing-out stuck drill bits, reversal of the rotation of the heads would be effected by electrical reversal of the rotation of the universal motor 54.

As previously indicated, the tool is a rotary power tool preferably with a suitable power inlet line 31 coupled to an on/off reversing switch 32. Actuation of the motor 54 is preferably controlled by a lever 33 useful for a handgrip. Manipulation of the forward/reverse button or lever 62 will reverse rotation of the motor 54. Current flows from the switch 32 through the wire 52 to a brush 50. The brush makes contact with the revolving armature 70 allowing current to flow through the armature to another brush 50 (not shown), which is connected by another wire (not shown) back to the switch 32. Current also flows from the switch 32 through the wire 53 to the field coil 51, and from the field coil back to the switch through another wire (not shown). A pinion 40 cut on the end of the armature shaft extending from bearing 41a through bearing 41b drives gear 42, which is coupled to shaft 18. Shaft 18 is mounted in bearings 43 and 44. On the end of shaft 18 is a pinion or gear 19 which simultaneously drives gears 20 and 21 in opposing directions. These gears are individually coupled to separate shafts 22 and 23 respectively, with shaft 23 mounted in bearings 38 and 37, and shaft 22 mounted in bearings 36 and 35. If desired, a fan 39 may be mounted on the armature shaft.

The drill chuck 52 may be of conventional construction. To expose the drill bit 17, an inner movable portion 57 of the guard mechanism 29 may slide back within an outer immovable portion 58. When the movable portion 57 is fully retracted, a spring-loaded detent pin 59 mounted on the movable portion 57 then engages a hole 60 in the immovable portion 58, locking it in place. To advance the guard, a spring-loaded detent-depressor 49 mounted on the immovable portion 58 drives detent pin 59 out of the hole 60, allowing spring 30 to force the movable portion 57 forward, safely encasing the bit 17. A similar hole with detent-depressor could be employed at the forward end of the immovable portion 58 to lock the movable portion 57 in the forward position, if deemed necessary for safety reasons. Other means, including a rapidly advancing screw mechanism, could be employed for the convenient retraction and advancement of the drill guard.

From the foregoing description it will be apparent that a rotary power tool constructed in accordance with the invention has several advantages. Both extensions of the tool extend in a direction opposite to each other, so that only one working tool is disposed against the piece being worked on. The screwdriver portion of the tool has an automatic clutch engagement and the screwdriver does not rotate when the drill is in use. Both ends of the tool are replaceable, for example, the screwdriver may be replaced by a drill bit also for clockwise rotation. Additional rotating tool bits, for example, a socket wrench, a tapper, or another drill bit may be substituted for the screwdriver bit and tool bit represented in the drawing.

The tool has fewer parts than tools of the prior art and is lightweight. Although the tool may derive electricity from different sources, including batteries, it is not limited to the use of electricity as a power source, and may be driven by other means, for example, compressed air. The nature of the rotary motion in either or both of the heads may be modified or combined with other kinds of motion to be used as, for example, a percussion drill or other fully rotary or semi-rotary tool.

While there has been described what is at present considered to be the preferred embodiment of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A rotary power tool comprising:
a body for supplying a power drive and including a central body portion having two extensions in opposite directions therefrom including rotary driven portions, for tools, which are rotatable in the same working direction as seen from said central body portion looking toward each driven portion.

2. A tool in accordance with claim 1 in which said two extensions are disposed generally normal to said central body portion.

3. A tool in accordance with claim 1 in which said central body portion includes a rotary drive mechanism including a drive pinion.

4. A tool in accordance with claim 3 in which said two extensions include gears driven by said pinion and have rotatable shafts individually attached to said gears.

5. A tool in accordance with claim 4 which includes a clutch having one clutch member coupled to one of said shafts and having another mating clutch member coupled to said one clutch member when under pressure during use of a tool coupled to said other clutch member.

6. A tool in accordance with claim 5 in which said tool coupled to said other clutch member is a screw driver.

7. A tool in accordance with claim 4 which includes another tool coupled another of said shafts.

8. A tool in accordance with claim 7 which includes a displaceable guard member for said other tool.

9. A tool in accordance with claim 7 in which said other tool is a drill bit.

10. A tool in accordance with claim 1 in which said same working direction is clockwise rotation.

11. A rotary power tool comprising:
a body for supplying a power drive and including a central body portion having two extensions in opposite directions therefrom including rotary driven portions, for tools, which are rotatable in the same working direction as seen from said central body portion looking toward each driven portion; and
electrical means for reversing the working direction of each of said rotary driven portions.

* * * * *